United States Patent [19]

Srinivasan et al.

[11] Patent Number: 4,901,573

[45] Date of Patent: Feb. 20, 1990

[54] INTEGRAL STRUCTURAL COMPONENT VIBRATORY BEHAVIOR CONTROL

[75] Inventors: Amrutur V. Srinivasan; David G. Cutts, both of Glastonbury; Graham B. Fulton, Manchester, all of Conn.

[73] Assignee: United Technologies Corporation, Hartford, Conn.

[21] Appl. No.: 290,532

[22] Filed: Dec. 27, 1988

[51] Int. Cl.⁴ .......................................... G01N 29/00
[52] U.S. Cl. ...................................... 73/579; 248/550
[58] Field of Search ................. 73/579, 582, 583, 570; 248/550; 350/6.3

[56] References Cited

U.S. PATENT DOCUMENTS

| | | | |
|---|---|---|---|
| 4,433,582 | 2/1984 | Joosten | 73/788 |
| 4,635,892 | 1/1987 | Baker | 248/550 |
| 4,763,967 | 8/1988 | Schermer | 350/6.3 |
| 4,817,768 | 4/1989 | Schumacher | 248/550 |

*Primary Examiner*—Hezron E. Williams
*Assistant Examiner*—Louis M. Arana
*Attorney, Agent, or Firm*—Peter R. Ruzek

[57] ABSTRACT

An arrangement for controlling the vibratory behavior of an integral structural component includes at least one element of memory metal material two portions of which that are spaced by a predetermined distance from one another in a first state of the memory metal material are connected while the memory metal material is in its first state to respective locations of the integral structural component that are spaced substantially by the predetermined distance from each other along a region of the integral structural component which undergoes considerable cyclical dimensional changes while the integral structural component vibrates. This element is then heated, such as by causing electric current to flow therethrough, either from time to time as required, or at a certain frequency, to above a temperature of transition of the memory metal material to its second state in which the spacing between the two portions of the element differs from the predetermined distance with attendant change in the vibratory behavior of the integral structural element such as to suppress or generate vibrations of the integral structural component especially at its natural resonance frequency.

12 Claims, 1 Drawing Sheet

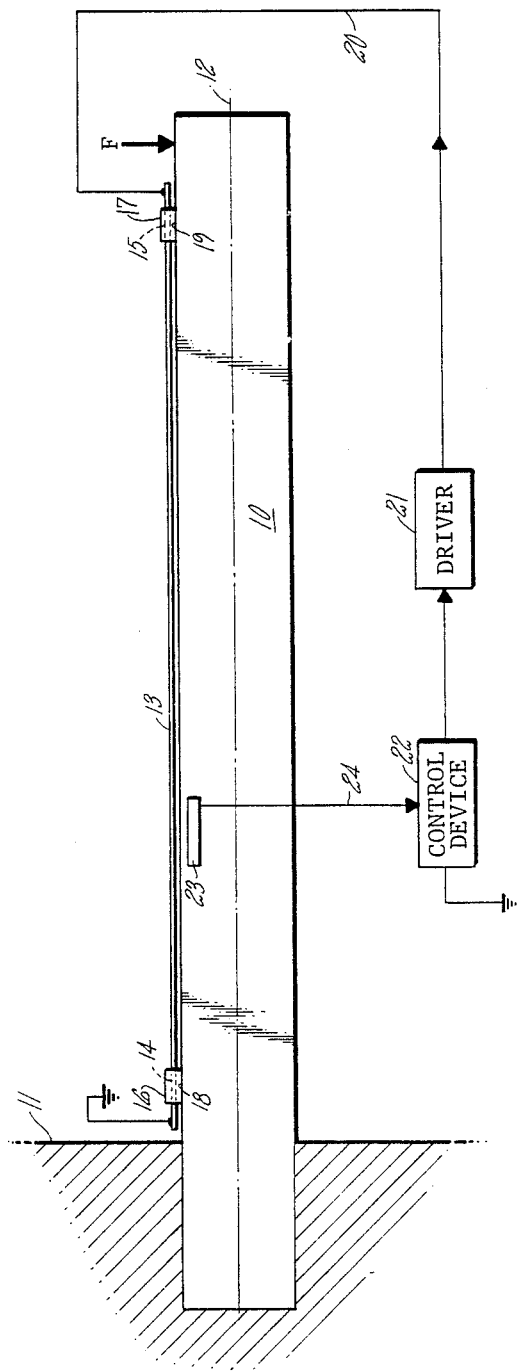

4,901,573

INTEGRAL STRUCTURAL COMPONENT VIBRATORY BEHAVIOR CONTROL

DESCRIPTION

1. Technical Field

The present invention relates to vibration control of structures in general, and more particularly to a method of and arrangement for controlling the vibratory behavior of an integral structural component.

2. Background Art

There are already known various constructions of arrangements capable of suppressing vibrations of an integral structural component. Most if not all of such known vibration suppressing arrangements are passive, that is, they suppress the vibrations of the component by absorbing or damping such vibrations. One such passive vibration suppressing arrangement is disclosed in the U.S. Pat. No. 4,433,582, issued on Feb. 28, 1984. This known arrangement utilizes at least one element made of a memory metal material for the inherently superior vibration damping properties of such material when in its austenitic state to isolate one component of an assembly from another so as to suppress transmission of vibrations between such components. The memory metal element remains in its austenitic state throughout the use of the assembly so that its role in the suppression of vibrations is totally passive.

Memory metal materials, the compositions, heat treatment and/or properties of which are known not only from the above reference but also, for instance, from the U.S. Pat. Nos. 4,149,911, issued Apr. 17, 1979 and 4,617,448, issued on Oct. 14, 1986, have certain interesting and rather unusual properties besides the aforementioned inherent pronounced vibration damping capability. The property for which such materials are being currently most frequently used is their dimensional change on temperature dependent conversion between their martensitic and austenitic states. The two above-mentioned references utilize this property of the memory metal materials, that is the dimensional change attending the conversion or transition of the memory metal material between its two states, for clamping and/or releasing one or more components of a structure. The transition is accomplished by heating the memory metal element, such as, for example, by passing an electric current therethrough. However, even here, after the transition is accomplished, the memory metal material remains in its respective state, so that vibration suppression, if any, occurs only as a result of the inherent vibration damping properties of such material, that is, it is once more totally passive. This constitutes a pronounced disadvantage in many applications in which it would be desirable to deal with vibrations in an active manner, that is, to either actively suppress such vibrations, or generate vibrations, in an integral structural component or in a structure incorporating such an integral structural component.

Accordingly, it is a general object of the present invention to avoid the disadvantages of the prior art.

More particularly, it is an object of the present invention to provide a method of controlling the vibratory behavior of an integral structural component, which method does not possess the disadvantages of the known methods of this kind.

Still another object of the present invention is to develop the method of the type here under consideration in such a manner as to be able to actively influence vibrations to which the integral structural component is subjected either by actively suppressing vibrations externally imposed on the integral structural component, or by changing the response of the integral structural component to such externally imposed vibrations, or by causing the integral structural component to vibrate at a given frequency.

It is yet another object of the present invention to devise an arrangement suited for the performance of the method the above type.

A concomitant object of the present invention is to design the arrangement of the above kind in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a method of and an arrangement for controlling the vibratory behavior of an integral structural component. This arrangement includes at least one element of memory metal material having two portions that are spaced by a predetermined distance from one another in a first state of the memory metal material, such portions being connected while the memory metal material is in its first state to respective locations of the integral structural component that are spaced substantially by the predetermined distance from each other along a region of the integral structural component which undergoes considerable cyclical dimensional changes while the integral structural component vibrates. The above element is then at least temporarily heated, such as by causing electric current to flow therethrough, to a temperature above that of transition of the memory metal material to its second state in which the spacing between the two portions of the element differs from the predetermined distance. This change in the state of the element and thus in the aforementioned spacing results in a commensurate change in the vibratory behavior of the integral structural element so that vibrations of the integral structural component especially at its natural resonance frequency are either suppressed or generated.

BRIEF DESCRIPTION OF THE DRAWING

The present invention will be described in more detail below with reference to the accompanying sole Figure of the drawing which is a somewhat simplified side elevational view of an exemplary implementation of a vibratory behavior controlling arrangement of the present invention as used in conjunction with an integral structural component constituted by a cantilevered beam.

BEST MODE FOR CARRYING OUT THE INVENTION

Referring now to the sole Figure of the drawing in detail, it may be seen that the reference numeral 10 has been used therein to identify an integral structural component which, in the illustrated example, is constituted by a beam that is mounted on a support 11 in a cantilevered fashion. However, it is to be mentioned at the very outset that this exemplary configuration and mounting of the integral structural component have been chosen for illustrative purposes only and that in fact the integral structural component 10 may have any desired configuration including that illustrated an may be mounted on a respective support either as illustrated or in any other manner, with the principles of the present invention being equivalently applicable regardless of the configuration and type of mounting of the integral structural component.

The integral structural component may be subjected to external forces, as diagrammatically indicated in a lumped fashion by an arrow F. Such external forces F may be vibratory or cyclical in nature and in any event they deform the integral structural component 10, in the illustrated example by bending the beam 10 downwardly in the plane of the drawing. As a result of this deformation, strains develop in various regions of the integral structural component 10, such strains being tensile in those regions of the integral structural component 10 that are situated above, and compressive in those regions of the integral structural component 10 that are located below, a neutral axis 12 of the integral structural component 10. Such strains and particularly the stresses associated therewith may eventually result in failure of the integral structural component 10, for instance due to fatigue of the material of the integral structural component 10.

To counteract this deformation and thus to avoid the failure of the integral structural component 10, or to otherwise modify the response of the integral structural component 10 to externally imposed forces F, there is employed at least one element 13 of a memory metal material. The memory metal element 13 may be elongated and, in the construction depicted in the drawing, may be constituted by a single wire or by a strand of wires of the memory metal material. The memory metal material of the element 13, which may be of the type that is commercially available under the designation Nitinol, is of the type that undergoes rapid transition or conversion from its martensitic to its austenitic state on heating and substantially equally rapid transition or conversion back to its martensitic state on cooling, with attendant shortening of the memory metal element 13 on heating and stretching of the memory metal element 13 under the influence of externally imposed forces on cooling. As illustrated, respective longitudinally spaced portions 14 and 15 of the memory metal element 13 are connected, by respective connecting arrangements 16 and 17, to respective longitudinally spaced regions 18 and 19 of the integral structural component 10. The connecting arrangements 16 and 17 may be of any known construction or type, such as mechanical clamping arrangements secured to the integral structural component 10, or bodies of adhesive connecting the portions 14 and 15 of the memory metal element 13 to the regions 18 and 19 of the integral structural component 10. The connecting operation is performed while the memory metal element 13 is in its martensitic state and in such a manner that the memory metal element 13 is substantially taut or possibly even slack when so connected. In any event, the original tension in the element 13, or its degree of tautness or slackness when connected, is selected in such a manner that the working stress in the element 13 is always below that hot limit stress at which the memory of the memory metal material could be destroyed.

When the integral structural component 10 is electrically conductive, the connecting arrangements 16 and 17 are so constructed as to electrically insulate the memory metal element 13 from the integral structural component 10. The reason for this is that, in accordance with the present invention, the memory metal element 13 is heated to convert its material to its austenitic state by passing electric current therethrough. This electric current is shown to be supplied to the portion 15 of the memory metal element 13 through an electric connecting line 20 from a driver 21 under the control of a control device 22, while the other portion 14 is shown to be grounded.

The driver 21 and the associated control device 22 may be constructed and operated in accordance with the present invention in a variety of ways which will be discussed below. The construction of the driver 21 and of its control device 22 will depend on the particular way in which they are to be operated, but such construction for any particular application will be readily apparent from the desired function or operation. So, for instance, for some applications, the driver 21 and the control device 22 may be incorporated in a simple manually operated on/off switch; however, in most instances, the driver 21 and its control device 22 will have more sophisticated constructions which need not and will not be described here because they can be derived in a straightforward fashion from the following description of the functions performed by or operation of such devices 21 and 22.

In operation, if the natural resonance frequency of the integral structural component 10 is known or ascertained in any known manner beforehand, the control device 22 may be simply used to activate the driver 21 when the frequency of the force F approaches this natural resonance frequency, for instance, as evidenced by the vibration of memory metal element 13 or its amplitude. Upon such activation, the electric current flowing through the memory metal element 13, which may be either direct current or alternating current, will convert the memory metal material of the memory metal element 13 from its martensitic to its austenitic state with attendant shortening of the memory metal element 13. Under these circumstances, the resonance frequency of the combination of the memory metal element 13 with the integral structural component 10 will be shifted away from the natural frequency of the integral structural component 10 alone, so that the external vibratory force F will not be able to evoke sympathetic vibrations in the integral structural component 10 at its natural frequency. When the danger has passed, the control device 22 may be operated to de-activate the driver 21 so that the memory metal element 13 can cool off and revert to its martensitic state while being stretched by tensile stresses acting thereon. It will be appreciated that, while the operation of the memory metal element 13 in this manner indeed changes the response of the integral structural component 10 to external vibrations, which is one form of vibratory behavior, the devices 21 and 22 can be operated in the above-discussed manner even if the force F does not cyclically vary, for instance, in response to an increase in the magnitude of the force F above a predetermined threshold. In this case, the memory metal element 13 will merely serve to stiffen the integral structural component 10.

For those instances where the natural frequency of the integral structural component 10 is not known beforehand, or where it is desired to make absolutely certain that the integral structural component 10 will not be set in vibration under any circumstances, there is provided at least one strain sensor 23 which is secured to a region of the integral structural component 10 at which the deformation of the integral structural component 10 has a pronounced effect. The information about the strain (and thus the stress) existing at this region of the integral structural component 10 as measured by the strain sensor 23 is supplied through an electric line 24 to the control device 22 where it is then used for evaluating the vibratory behavior of the integral structural component 10 in response to the force the integral structural component 10 (i.e. the onset or approach of sympathetic vibrations in the integral structural component 10 or excessive bending of the integral structural component 10 by a constant force F) and controlling the driver 21 accordingly, in the manner discussed above.

As described so far, the arrangement of the present invention is to be operated in an active manner in that it responds to actual external influences in such a way as to avoid the otherwise existing deleterious effect of such influences on the integral structural component 10, but this manner is still merely reactive or preventative and utilizes the principle of stiffening the integral structural component 10 by the memory metal element 13 during periods of danger. However, the present invention can also be employed to advantage in a proactive or counteracting manner, that is, to actually fight the influence of the vibratory external force F on the integral structural component 10. For the above arrangement to operate in this mode, the control device 20 evaluates the signals supplied to it through the line 24 from the strain sensor 23 and activates the driver 21 in a cyclical manner, preferably at the same frequency as that of the force F and in such a phase relationship thereto considering the time delay between the issuance of the driving signal by the driver and the actual transition of the memory metal element 13 from its martensitic state to its austenitic state or vice versa that the memory metal element 13 is shortened in phase with the increase in the downwardly oriented magnitude of the force F and stretched by imposed tensile stresses during the decrease in such downwardly oriented magnitude. Thus, the memory metal element 13 applies compressive stresses to the integral structural component 10 the region at which the strain sensor 23 is located simultaneously with the application of tensile stresses to the same region by the force F, and causes development of tensile stresses at regions below the neutral axis 12 at the same time as the force F has a tendency to compress such regions. While the memory metal element 13 will in most instances not be able to suppress the vibrations of the integral structural component 10 resulting from the application of the vibratory force F completely, particularly in the region of resonance, it will at least considerably diminish the influence of the force F on the integral structural component 10, thus considerably extending the lifespan of the integral structural component 10. Experience has shown that it is possible to operate the memory metal element 13 in this cyclical fashion at a frequency of several Hertz or tens of Hertz, which is in the range of natural resonant frequency of the integral structural component 10 in many applications. However, it may be possible to counteract or generate vibrations at even higher frequencies, for instance by employing a plurality of the elements 13 and operating them one after the other in a cyclical fashion.

While the present invention as described so far dealt with one kind of vibratory behavior of the integral structural component 10, that is, its response to the external vibratory force F, it will be appreciated that the above arrangement can also be used to control another kind of vibratory response of the integral structural component 10, that is, its response to the application of a periodic force exerted thereon by the memory metal element 13 at a frequency close to or at the natural resonant frequency of the integral structural component 10. If this mode of operation is desired, and if the natural resonance frequency of the integral structural component 10 is known, the control device 22 is simply used to activate the driver 21 at this natural resonance frequency, thus setting the integral structural component 10 in vibration at this frequency. A similar approach but without operating at the natural frequency may be used when it is necessary or desired to merely change the shape of the integral structural component 10 without setting it in vibration.

If the memory metal element 13 were of a material that expands rather than contracts on heating, then a bar of this material could be arranged to fit snugly between abutment surfaces provided on or in the integral structural component 10 when in its contracted condition so that it would brace itself against the abutment surfaces and attempt to push them apart in its extended condition, with the effect being similar to that described above provided that the memory metal element 13 were arranged below the neutral axis of the integral structural component 10 under these circumstances.

It will be appreciated that, even though the present invention has been discussed above as using a memory metal material having a one-way memory, that is a material which has to have axial forces applied thereto during reversion to its original state in order to have its longitudinal dimension changed toward its original length, the principles of the present invention are equally applicable to other materials having two-way memory where the reversionary dimensional change takes place automatically in response to the appropriate temperature change regardless of the forces acting on the element 13 during such reverse transition.

If so desired, more than one of the memory metal elements 13 may be provided at different critical regions of the integral structural component 10, and they can be operated by the driver 21 under the control of the control device either in unison or at different times to achieve the desired purpose of appropriately controlling the behavior of the integral structural component 10.

While the present invention has been illustrated and described as embodied in a particular construction of a vibratory behavior control arrangement, it will be appreciated that the present invention is not limited to this particular example; rather, the scope of protection of the present invention is to be determined solely from the attached claims.

We claim:

1. A method of controlling the vibratory behavior of an integral structural component, comprising the steps of
connecting two portions of at least one element of memory metal material that are spaced by a predetermined distance from one another in a first state of the memory metal material while said memory metal material is in said first state thereof to respective locations of the integral structural component that are spaced substantially by said predetermined distance from each other along a region of the integral structural component which undergoes considerable cyclical dimensional changes while the integral structural component vibrates; and employing said element for subjecting the integral structural component to periodic vibratory forces having a predetermined periodicity at least close to a natural resonance frequency of the integral structural component by causing the temperature of said element to alternatingly temporarily rise above and fall below a temperature of transition of said memory metal material to a second state thereof in which the spacing between said two portions of said element differs from said predetermined distance with attendant change in the vibratory behavior of the integral structural component.

2. The method as defined in claim 1, wherein said employing step includes causing electric current to flow through said element.

3. The method as defined in claim 2, wherein said causing step includes intermittently supplying the electric current to said element at said predetermined periodicity.

4. The method as defined in claim 3, and further comprising the steps of sensing the vibratory behavior of the integral structural component at least during the performance of said employing step, and controlling said supplying step in dependence on information obtained from the performance of said sensing step.

5. The method as defined in claim 4, wherein said sensing step includes measuring strains to which the integral structural component is subjected by external vibratory influences; and wherein said controlling step includes determining at least the frequency and phase of the external vibratory influences from the timing and magnitudes of the strains measured during said measuring step, and periodically changing the magnitude of the electric current in such a frequency and phase relationship to the external vibratory influences as to suppress the vibrations of the integral structural component in response to such influences.

6. The method as defined in claim 4, wherein said sensing step includes measuring strains to which the integral structural component is subjected by vibratory influences; and wherein said controlling step includes determining the resonant frequency of the integral structural component from the timing of the strains measured during said measuring step, and periodically changing the magnitude of the electric current applied at said resonant frequency as to set the integral structural component in vibration at said resonant frequency.

7. An arrangement for controlling the vibratory behavior of an integral structural component, comprising at least one element of memory metal material;

means for connecting two portions of said element that are spaced by a predetermined distance from one another in a first state of the memory metal material while said memory metal material is in said first state thereof to respective locations of the integral structural component that are spaced substantially by said predetermined distance from each other along a region of the integral structural component which undergoes considerable cyclical dimensional changes while the integral structural component vibrates; and means for causing the temperature of said element to alternatingly temporarily rise above and fall below a temperature of transition of said memory metal material to a second state thereof in which the spacing between said two portions of said element differs from said predetermined distance for said element to subject the integral structural component to periodic vibratory forces having a predetermined periodicity at least close to a natural resonance frequency of the integral structural component, with attendant change in the vibratory behavior of the integral structural component.

8. The arrangement as defined in claim 7, wherein said causing means includes means for causing electric current to flow through said element.

9. The arrangement as defined in claim 8, wherein said causing means includes means for supplying the electric current to said element at said predetermined periodicity.

10. The arrangement as defined in claim 9, further comprising means for sensing the vibratory behavior of the integral structural component, and wherein said supplying means includes means for controlling the supply of the electric current in dependence on information obtained from said sensing means.

11. The arrangement as defined in claim 10, wherein said sensing means includes means for measuring strains to which the integral structural component is subjected by external vibratory influences; and wherein said controlling means includes means for determining at least the frequency and phase of the external vibratory influences from the timing and magnitudes of the strains measured by said measuring means, and means for periodically changing the magnitude of the electric current supplied by said supplying means in such a frequency and phase relationship to the external vibratory influences as to suppress the vibrations of the integral structural component in response to such influences.

12. The arrangement as defined in claim 10, wherein said sensing means includes means for measuring strains to which the integral structural component is subjected by vibratory influences; and wherein said controlling means includes means for determining the resonant frequency of the integral structural component from the timing of the strains measured by said measuring means, and means for periodically changing the magnitude of the electric current supplied by said supplying means at said resonant frequency as to set the integral structural component in vibration at said resonant frequency.

* * * * *